United States Patent Office 3,099,328
Patented July 30, 1963

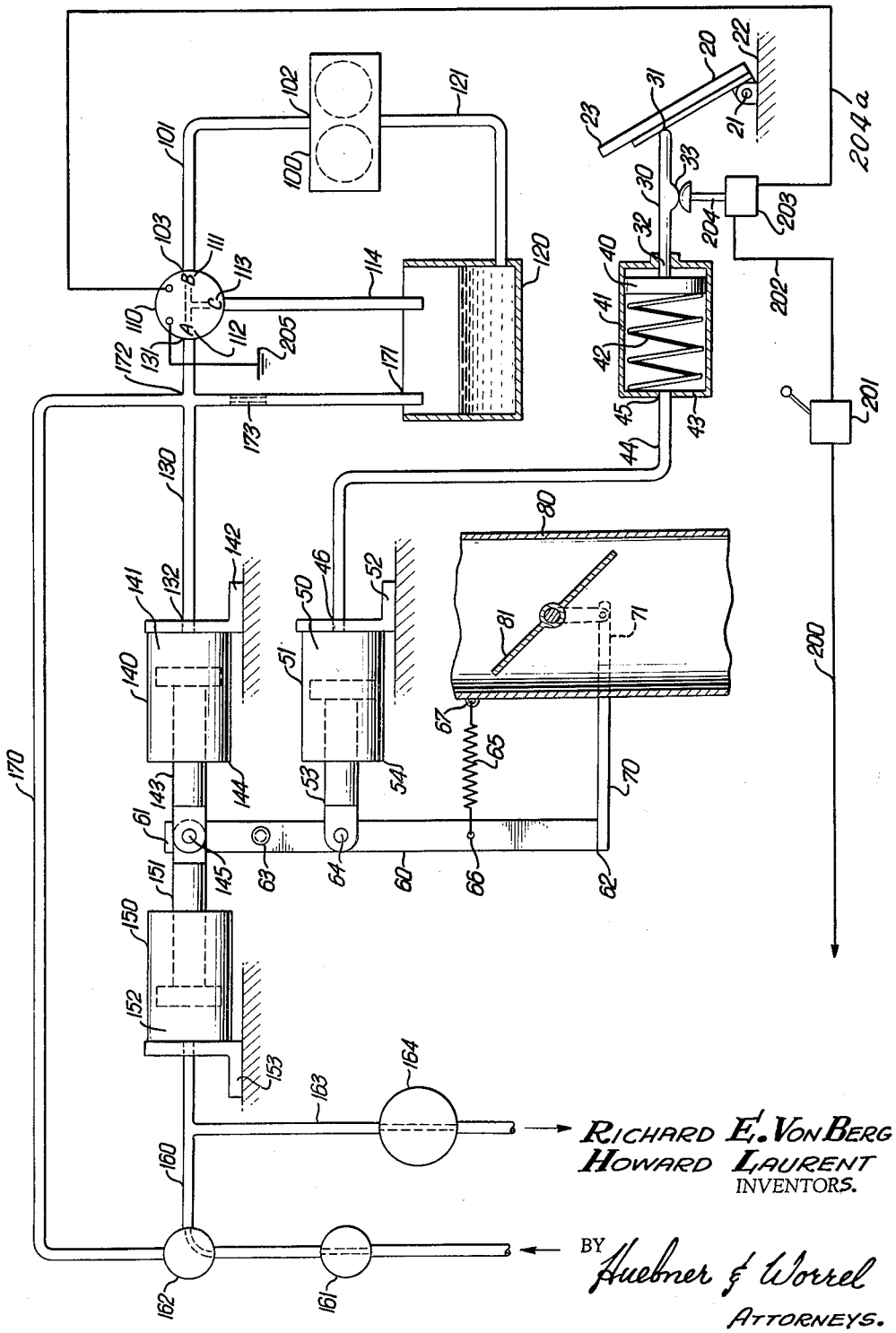

3,099,328
HYDRAULIC SPEED CONTROL DEVICE
Richard E. Von Berg, Anaheim, and Howard Laurent, Corona del Mar, Calif., assignors to Rheem Manufacturing Company, New York, N.Y., a corporation of California
Filed Aug. 25, 1960, Ser. No. 51,824
5 Claims. (Cl. 180—82.1)

This invention relates to a hydraulic device for adjustable control of the speed of operation of engines, and more specifically to a speed control device for internal combustion engines. The device is particularly adaptable for use on internal combustion engines of automotive vehicles.

The potential, smooth, rapid acceleration of modern automotive vehicles to high speeds requires the constant attention of their operators so that undesired excess speeds may be avoided. Especially in open highway driving, a driver must constantly watch his speedometer or other speed indicator to assure maintenance of safe, constant speeds, and to vary those speeds as dictated by speed zone requirements.

Many speed control mechanisms have been devised to control the maximum speed of operation of internal combustion engines, regardless of excess amounts of acceleration applied to such engines, and so-called "governors" are examples of such prior devices, but such former devices offer objectionable limitations, such as lack of flexibility of operation and pre-set system rigidity which makes it impossible to render them inoperable when, as frequently occurs, it is desired to exceed, intentionally, the maximum control speeds which they have been set to regulate. Other elaborate, complex devices operated by vacuum, manifold pressure, or involved electrical systems have also been presented. One obvious substantial advantage of the device of the present invention over such devices is its simplicity.

Other advantages of the device of the present invention will be apparent when various driving conditions are considered. For instance, assume that an automobile is being operated in heavy traffic in a busy city where speeds exceeding, say 25 miles per hour are practically impossible, and where constant braking, stopping and slower operations are required. Under those conditions, the device of the present invention may be readily made inoperable by the simple throwing of a master electrical switch conveniently mounted on, say, the dashboard of the automobile, and the acceleration and deceleration of the car will be accomplished substantially in the normal manner, except that it will be more smoothly accomplished due to the sealed hydraulic carburetor control system of the present device, hereinafter described.

Now assume that the car passes out of the city and into a suburban area where the posted speed limit is, say, 45 miles per hour. The driver may then set the dial indicator of the device of the present invention at that 45 miles per hour maximum speed, and as he accelerates the car, the speed will increase until it reaches the indicated maximum, whereupon the present device will hold the acceleration at that point, and the driver may continue on his way without the necessity of constantly taking his eyes off the road to refer to his speedometer, and without fear of exceeding the indicated speed limit. If, under those circumstances, the driver should want to slow down below the set speed, he need only let up the pressure on his pedal accelerator, just as in normal driving.

Then assume the car passes through the suburban area and is now on an open highway, where the posted speed limit is, say, 65 miles per hour, and the driver wishes to operate his car at the speed limit. He need only change his dial reading from 45 miles per hour to 65 miles per hour to accomplish this purpose. The operation of the device at the new indicated speed will be exactly as it was at the assumed 45 miles per hour setting, with deceleration just as readily accomplished.

Finally assume that while the car is running at the indicated set maximum speed of 65 miles per hour, a sudden emergency arises, and the driver wishes to exceed the set 65 miles per hour speed, as for instance if the driver is passing a slower moving vehicle and another car is approaching in the opposite direction so that it is imperative to rapidly pass the slow vehicle and return to the proper driving lane. Under those circumstances, even though the device is set to control the speed at a maximum of 65 miles per hour, substantial down pressure on the accelerator pedal will promptly render the device inoperable to control speed at the indicated level, and the driver may operate his car at any desired excess speed. When the emergency has passed, the driver need only relieve his over-pressure on the accelerator pedal, whereupon the speed control feature of the device will again become operable to limit the speed at the indicated 65 miles per hour.

The utility of other speed control devices presently in use is limited by the lack of operable flexibility to meet such rapidly changing operating conditions. This defect has been overcome in the device of the present invention in which rapid adjustment is possible under all operating conditions.

It is an object of the present invention to provide a device which will control but not permanently limit the speed of operation of engines, and especially internal combustion engines of automotive vehicles.

It is a further object of the invention to provide such a device which will operate smoothly and effectively by the use of hydraulic systems.

It is another object of the invention to provide such a device which is simple to install on an engine without substantial alterations or adjustments in the engine.

It is still another object of the invention to provide such a device which is easy and inexpensive to manufacture, assemble and install.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings, the FIGURE is a diagrammatic representation of the device of the present invention.

An accelerator pedal 20 is pivotally mounted at one end 21 thereof to the floor 22 of an automobile. Said accelerator pedal has a free end 23.

A link 30 is mounted by one end 31 thereof to said pedal 20 intermediate the ends 21 and 23 of said pedal 20, said link 30 having another end 32. Intermediate said ends 31 and 32 is a detent 33.

A piston 40 is mounted on the end 32 of said link 30 and disposed in a hydraulic cylinder 41. Spring 42 is disposed in said cylinder 41 so as to bias piston 40 outwardly in said cylinder 41.

Mounted on the end 43 of cylinder 41 opposite piston 40 is a hydraulic fluid line 44, having access through an opening in the end 43 of cylinder 41 to the interior of cylinder 41 at one end 45 of said fluid line 44. The other end 46 of said fluid line 44 is mounted on one end 50 of a hydraulic actuator 51 and there is hydraulic fluid access from said fluid line 44 to said hydraulic actuator 51. Said hydraulic actuator 51 may be mounted by any suitable means, such as an angle bracket or support 52, to any suitable base. A protruding end member 53 is mounted on the other end 54 of said hydraulic actuator 51.

A throttle member 60 having ends 61 and 62 is pivotally mounted, as at 63, intermediate the ends 60 and 61 thereof to a suitable base. End member 53 of hydraulic actuator 51 is pivotally mounted adjacent its outwardly protruding edge on said throttle member 60 at a point such as 64, intermediate the ends 61 and 62 of said throttle 60, said point 64 being spaced apart from said pivotal mounting 63. Throttle member 60 has a link 70 mounted at or adjacent to end 62, said link 70 having a free end 71 operatively connected to a carburetor 80. A tension spring 65 has one end 66 thereof attached to said throttle 60 intermediate end 62 and point 64, and at the other end 67 thereof spring 65 is affixed to any suitable base. Said spring 65 is disposed so as to bias throttle 60 against the hydraulic action of hydraulic actuator 51, and consequently, so as to bias link 70 toward carburetor 80, activating butterfly valve 81 mounted in said carburetor 80 toward a closed position.

The hydraulic fluid in cylinder 41, fluid line 44, and hydraulic actuator 51, constitutes a sealed hydraulic pressure system whereby, when pressure is exerted on pedal 21, added sealed hydraulic pressure in said system will be exerted by piston 40 acting against the bias of spring 42, so that said fluid pressure in said fluid line 44 will be increased to cause the protruding end member 53 of hydraulic actuator 51 to exert pressure on throttle 60 sufficient to overcome the biasing action of spring 65. Link 70 will then cause butterfly valve 81 in carburetor 80 to open and allow a greater flow of combustible fluid through carburetor 80.

A standard fixed-volume hydraulic pump 100 is driven by the vehicle's speedometer cable (not shown), or other suitable drive means related to the vehicle's speed. When the device is used with a stationary engine, the pump is operated by the load change.

A hydraulic fluid outlet line 101 is operatively connected at one end 102 thereof to said pump 100. The other end 103 of said line 101 is operatively connected to a solenoid valve 110 at a port 111. Solenoid valve 110 also has ports 112 and 113. A fluid outlet line 114 is operatively connected at one end thereof to solenoid valve 110 at port 113, and line 114 is operatively connected at its other end to a hydraulic reservoir 120. A hydraulic fluid line 121 is operatively connected at one end thereof to reservoir 120 and at its other end to pump 100.

Another hydraulic fluid line 130 is operatively connected by one end 131 thereof to port 112 of solenoid valve 110, and at its other end 132 thereof is operatively connected to a second hydraulic actuator 140 at one end 141 of said actuator 140. Said actuator 140 may be mounted at end 141 to any suitable base by any suitable means, such as an angle bracket or support 142. A protruding end member 143 is mounted on the other end 144 of said actuator 140. End member 143 is pivotally mounted adjacent its outwardly protruding edge on throttle member 60 at a point 145 adjacent the end 61 of throttle member 60.

A third hydraulic actuator 150 is pivotally mounted in opposed relationship to the second actuator 140 at the same pivotal point 145 on throttle member 60 by a protruding end member 151 of actuator 150. Actuator 150 may be mounted at its other end 152 to any suitable base by any suitable means, such as an angle bracket or support 153.

A hydraulic fluid supply line 160, leading from a hydraulic fluid supply source (not shown), such as, by way of illustration, but not by way of limitation, the oil line of the engine, the power steering system of an automotive vehicle, or a second stage reservoir operatively connected to pump 100, and said line 160 is operatively connected to actuator 150 at end 152 thereof.

It is desirable to keep the hydraulic fluid in line 160 at a reasonably low pressure, and consequently a pressure regulating valve 161 may be mounted on said line 160 to reduce hydraulic supply pressure to the desired working pressure.

A pressure-operated, normally closed, shut-off valve 162 is also mounted on line 160, and operatively connected to line 160 between valve 162 and actuator 150 is a hydraulic fluid return line 163 leading to a sump (not shown).

A control valve 164 is mounted on line 163 and controls the fluid return in line 163. It will be noted that in normal operation control valve 164 is never completely closed. Control valve 164 is regulated by any suitable, readily-accessible means, such as by operative connection to a dial speed indicator (not shown) mounted on, say, the dashboard of the automotive vehicle or the control panel of the stationary engine.

Another hydraulic fluid line 170 is operatively connected at one end 171 thereof to reservoir 120, and has a fluid junction connection, as at 172, with fluid line 130 at a point intermediate solenoid valve 110 and actuator 140. Fluid line 170 continues to pass from point 172 to an operative connection with shut-off valve 162.

A bleed-off, which may be a fixed orifice 173, is provided on line 170, intermediate end 171 and junction connection 172 with line 130.

An electrical connection 200 is made from an electrical power source, as by connection to an ignition switch (not shown), to one side of a master switch 201. The other side of master switch 201 is connected by an electric line 202 to one side of a micro switch 203. Micro switch 203 has a plunger 204 disposed so as to make abutting contact with detent 33 on link 30.

The other side of micro switch 203 is electrically connected to solenoid valve 110 by line 204a, and solenoid valve 110 is in turn connected to a ground 205.

The operation of the device may best be described by considering the functions of the device under various conditions occurring when the device is installed on a motor vehicle.

When the vehicle is parked and the engine is not operating, pump 100 is not operating and solenoid valve 110 is closed, so that there is no flow of hydraulic fluid through line 101 and line 130 to actuator 140, because solenoid valve 110 closes the flow passage between ports 111 and 112. Pressure in fluid lines 130 and 170, as well as in actuator 140, is released through fixed orifice 173 into reservoir 120. Because there is no substantial fluid pressure in line 170, valve 162, the pressure-operated, normally closed shut-off valve, will be in closed position. Any pressure in line 160, and of course in actuator 150 as well, is released through line 163 and control valve 164 to the sump. Because no pressure is being exerted on pedal 20, piston 40 will be in the right-hand position in cylinder 41, as shown in the drawing, biased in that position by spring 42. Thus no fluid pressure is being exerted on actuator 51 through line 44. Because no pressure is being exerted on any of actuators 51, 140, or 150, throttle 60 is not being moved by them, and tension spring 65 will operate to pivot end 62 to the right, thus causing link 70 to close butterfly valve 81 in carburetor 80.

When the engine is started, and the driver desires to operate the vehicle without taking advantage of the speed control features of the device, master switch 201 will be in off position, and consequently solenoid valve 110 will not be energized and will remain closed. When the driver now wishes to accelerate, the operation is substantially the same as the normal operation of a motor vehicle, except that the linkage between pedal 20 and carburetor 80 is substantially hydraulic rather than entirely mechanical. Pressure on pedal 20 will move piston 40 to the left, thereby building up hydraulic fluid pressure in the sealed pressure system comprised of cylinder 41, line 44 and actuator 51, thus causing actuator 51 to pivot end 62 of throttle 60 to the left, in turn causing link 70 to open butterfly valve 81 in carburetor 80 to allow a flow of fuel into the engine. When pressure on pedal 20 is relieved, the reverse action will occur, pressure in actuator 51, line 44 and cylinder 41 being relieved, thus allowing tension spring 65 to act to return throttle 60 to the closed position to the right.

While the vehicle is moving along without the utilization of the speed control features of the device, and with solenoid valve 110 closed, pump 100 will nevertheless be in operation because it is driven by the speedometer cable. Under these conditions, the output of pump 100 will pass through line 101 and through port 111 into solenoid valve 110, but port 112 will be closed, so that it will not pass into line 130, but instead will go through port 113, thence through line 114 to reservoir 120, and then by means of line 121 back to pump 100, resulting in a complete by-pass of the rest of the hydraulic fluid system of the device.

When the driver wishes to utilize the speed control features of the device he closes master switch 201, thereby rendering micro switch 203 operable and making it possible to energize solenoid valve 110 to open it. With master switch 201 closed, when pressure is exerted on pedal 20, detent 33 will make contact with plunger 204 on micro switch 203, closing micro switch 203 and energizing line 204a to solenoid valve 110. Only a slight amount of pressure on pedal 20 is required to establish the contact between detent 33 and plunger 204, and this pressure is not sufficient to cause throttle 60 to open. After contact between detent 33 and plunger 204 has been established, any substantial increase or decrease of pedal pressure will disengage this contact.

Suppose that the driver wishes to travel at 40 miles per hour and to control speed at that point. He will set control valve 164 at that point. He then either increases foot pedal pressure until contact is made between detent 33 and plunger 204, or if he is already moving rather rapidly, he decreases pressure until that contact is made. With master switch 201 and micro switch 203 closed, solenoid valve 110 will now open, and fluid flow by way of ports 111 and 112, between lines 101, 130 and 170 will be established, while by-pass flow through port 113 will be shut off.

Pump 100 will build up hydraulic fluid pressure in line 130 and in actuator 140. Pressure will also build up in line 170, and valve 162 will be opened by this pressure. Excess pressure in lines 130 and 170 will bleed off through fixed orifice 173. Pressure will then build up in line 160 and in actuator 150, this latter pressure being controlled by control valve 164, which will bleed off any excess pressure on actuator 150.

When the desired speed of 40 miles per hour is reached, the pressures of actuators 140 and 150 on end 61 of throttle 60 will be in balance, thus holding throttle 60, and in turn link 70 and butterfly valve 81, in proper position to sustain and maintain that speed.

It will be seen that pressure in actuator 150, regulated as it is by pressure-regulator valve 161, will be constant, while pressure in actuator 140 will vary depending on the speed of the automobile and the resulting speed of pump 100.

While the speed control features of the device are being utilized, actuator 51 will not be acting upon throttle 60 because pedal 20 will only be depressed sufficiently to make contact between detent 33 and plunger 204, and not sufficiently to move piston 40 enough to build up pressure in line 44.

Now suppose that the vehicle has reached the set speed of 40 miles per hour on a level grade, but an upgrade is encountered. Due to the upgrade, the vehicle will commence to slow down. As a result of this slower speed, pump 100 will turn over slower, and the pressure output of pump 100 will also decrease. With less pressure being supplied to actuator 140, actuator 150 will overcome it and be able to move end 61 of throttle 60 to the right, thus moving end 62 of throttle 60 to the left and, by means of link 70, opening butterfly valve 81. As vehicle speed increases, output of pump 100 will also increase until the set speed is again reached at which point actuators 140 and 150 again will be in balance.

With the vehicle moving at a predetermined set speed, override and underride are easily accomplished if and when desired. To override, depressing pedal 20 will break the contact between detent 33 and plunger 204 and open micro switch 203. Solenoid valve 110 will then close, and actuators 140 and 150 will become inoperable, while actuator 51 will become operable and will act upon throttle 60 in the manner hereinabove described. To underride, release of pressure on pedal 20 will similarly break contact, with the same results.

If the speed setting has been made at, say, 40 miles per hour, but the driver has overridden, as for an emergency, and when the need for override is past, the driver need only relieve the extra pressure on pedal 20 until contact is again established between detent 33 and plunger 204, whereupon the speed control elements of the device again will become operable.

It has been found advantageous, but not essential, to arrange the controls of the device so that a pressure equivalent to that obtained when the vehicle is traveling at slightly under 25 miles per hour is required to open valve 162, and to provide that the driver must exceed a speed of 25 miles per hour before the speed control features of the device become operable, which is accomplished by release of pedal pressure until contact is made between detent 33 and plunger 204.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent structures and devices.

We claim:

1. A hydraulic speed control device for an internal combustion engine which comprises: a hydraulic pump controlled by the speed of an automotive vehicle; a solenoid valve hydraulically connected to said pump so as to block hydraulic pressure when the device is inoperative, and to pass hydraulic pressure when the device is operative; a first hydraulic pressure line connected to said solenoid valve; a first actuator connected to said first hydraulic pressure line so as to be operative when hydraulic pressure passes through said solenoid valve; a throttle having ends, pivotally mounted on a base intermediate the ends of said throttle and having said first actuator pivotally connected to said throttle adjacent one end of said throttle so as to pivotally move said throttle upon actuation of said first actuator; a link mounted on said throttle adjacent the other end of said throttle; a carburetor flow valve operatively connected to said link; a second hydraulic pressure line operatively connected to said first hydraulic pressure line intermediate said solenoid valve and said first actuator; a pressure-operated shut-off valve connected to said second hydraulic pressure line to prevent operation of the device until a predetermined vehicular speed is reached; a third hydraulic pressure line having ends, having one end connected to a fluid source and having said shut-off valve connected intermediate said ends, said shut-off valve being disposed so as to open when hydraulic pressure in the second hydraulic pressure line reaches a predetermined pressure controlled by vehicular speed; and a second actuator connected to the other end of said third hydraulic pressure line and pivotally connected to said throttle in opposed relationship to said first actuator so as to be actuated by hydraulic pressure passing through said shut-off valve, and so as to resist pressure exerted by said first actuator.

2. A hydraulic speed control device for an internal combustion engine as defined in claim 1, including a control valve connected to said third hydraulic pressure line intermediate said shut-off valve and said second actuator so as to selectively control the opposed relationship of said second actuator to the first actuator.

3. A hydraulic speed control device for an internal combustion engine as defined in claim 2, including a bleed-off line connected to said control valve.

4. A hydraulic speed control device for an internal combustion engine as defined in claim 3, including a pressure-regulating valve connected to said third hydraulic pressure line intermediate said fluid source and said shut-off valve.

5. A hydraulic speed control device for an internal combustion engine as defined in claim 4 including a tension spring connected to said throttle so as to bias said throttle in position to close said carburetor flow valve.

References Cited in the file of this patent

UNITED STATES PATENTS

| | | |
|---|---|---|
| 2,148,729 | Coffey | Feb. 28, 1939 |
| 2,324,191 | Bowers | July 13, 1943 |
| 2,369,397 | Kostenick | Feb. 13, 1945 |
| 2,486,369 | Goss | Oct. 25, 1949 |
| 2,714,880 | Riley | Aug. 9, 1955 |
| 2,916,100 | Teetor | Dec. 8, 1959 |
| 2,972,391 | Faiver et al. | Feb. 21, 1961 |

FOREIGN PATENTS

| | | |
|---|---|---|
| 478,322 | Italy | Feb. 23, 1953 |
| 568,054 | Great Britain | Mar. 15, 1945 |